(12) United States Patent
Park

(10) Patent No.: US 6,720,362 B1
(45) Date of Patent: Apr. 13, 2004

(54) PERFORATED FOAMS

(75) Inventor: Chung P. Park, Baden-Baden (DE)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/762,161

(22) PCT Filed: May 27, 1999

(86) PCT No.: PCT/US99/11754

§ 371 (c)(1),
(2), (4) Date: Mar. 12, 2001

(87) PCT Pub. No.: WO00/15697

PCT Pub. Date: Mar. 23, 2000

Related U.S. Application Data

(60) Provisional application No. 60/100,699, filed on Sep. 17, 1998.

(51) Int. Cl.[7] .................................................. C08J 9/00
(52) U.S. Cl. .......................... 521/79; 521/81; 521/918
(58) Field of Search ............................. 521/79, 81, 918

(56) References Cited

U.S. PATENT DOCUMENTS

| | | | |
|---|---|---|---|
| 3,239,585 A | 3/1966 | Karpovich et al. ............ 264/84 |
| 3,386,877 A | 6/1968 | Skochdopole et al. ...... 161/160 |
| 3,573,152 A | 3/1971 | Wiley et al. ................... 161/60 |
| 4,154,785 A | 5/1979 | Inui et al. .................. 264/45.5 |
| 4,229,396 A | 10/1980 | Suh et al. ....................... 264/53 |
| 4,423,101 A | 12/1983 | Willstead ....................... 428/76 |
| 4,435,346 A | 3/1984 | Ito et al. ........................ 264/54 |
| 4,548,775 A | 10/1985 | Hayashi et al. ............. 264/45.5 |
| 4,714,716 A | 12/1987 | Park ............................. 521/80 |
| 4,916,198 A | 4/1990 | Scheve et al. ............... 526/351 |
| 5,116,881 A | 5/1992 | Park et al. ................... 521/143 |
| 5,206,082 A | 4/1993 | Malone ....................... 428/294 |
| 5,242,634 A | 9/1993 | Matsumoto .................. 264/25 |
| 5,348,795 A | 9/1994 | Park ............................. 428/220 |
| 5,424,016 A | 6/1995 | Kolosowski ................. 264/156 |
| 5,527,573 A | 6/1996 | Park ......................... 428/314.8 |
| 5,567,742 A | 10/1996 | Park ............................. 521/143 |
| 5,585,058 A | 12/1996 | Kolosowski ................. 264/156 |
| 5,605,936 A | 2/1997 | DeNicola, Jr. et al. .... 521/50.5 |
| 5,618,853 A | 4/1997 | Vonken et al. ................. 521/60 |
| 5,643,969 A | 7/1997 | Sakamoto et al. ............ 521/81 |
| 5,776,390 A | 7/1998 | Fiddelaers et al. ............ 264/50 |
| 5,801,208 A | 9/1998 | Lee .............................. 521/98 |
| 5,817,705 A | 10/1998 | Wilkes et al. ................. 521/79 |
| 5,843,058 A | 12/1998 | Quist ......................... 604/369 |
| 5,929,127 A | 7/1999 | Raetzsch et al. .............. 521/81 |
| 5,929,129 A | 7/1999 | Feichtinger ................. 521/134 |
| 6,007,890 A | 12/1999 | DeBlander ................... 428/72 |
| 6,030,696 A | 2/2000 | Lee ............................. 428/220 |
| 6,187,232 B1 * | 2/2001 | Chaudhary et al. | |
| 6,207,254 B1 | 3/2001 | Lee et al. .................... 428/159 |
| 6,225,366 B1 | 5/2001 | Raetsch et al. ............. 521/134 |
| 6,251,319 B1 | 6/2001 | Tusim et al. ............... 264/45.9 |
| 6,284,842 B1 | 9/2001 | Ho et al. ..................... 525/194 |
| 6,369,120 B1 * | 4/2002 | Chaudhary et al. | |

FOREIGN PATENT DOCUMENTS

| | | | |
|---|---|---|---|
| DE | 3514817 | 10/1985 | .............. C08J/9/38 |
| EP | 190889 | 4/1993 | .............. C08F/8/50 |
| EP | 674578 | 10/1995 | ........... B29C/44/00 |
| JP | 5-9030871 | 2/1984 | ............ C09D/7/12 |
| JP | 6-2273826 | 11/1987 | ........... B29C/59/02 |
| JP | 0-2188233 | 7/1990 | ........... B29C/67/20 |
| WO | WO 84/00901 | 3/1984 | ........... B01D/39/00 |
| WO | WO 90/14159 | 11/1990 | ............ B01J/20/26 |
| WO | WO 94/13460 | 6/1994 | ........... B29C/67/22 |
| WO | WO 00/15700 | 3/2000 | .............. C08J/9/00 |
| WO | WO 94/13459 | 3/2000 | .............. C08J/9/00 |

OTHER PUBLICATIONS

Front page only of WO 95/14136 published on May 26, 1995 (earlier published patent family member of A6 reference, U.S. patent 6,007,890).

Front page only of WO 98/02483 published on Jan. 22, 1998 (earlier published patent family member of A7 reference, U.S. patent US 5,929,129).

Front page only of WO 94/28839 published on Dec. 22, 1994 (earlier published patent family member of A9 reference, U.S. patent 5,843,058).

Front page only of WO 98/16575 published on Apr. 23,1998 (earlier published patent family member of A10 reference, U.S. patent 5,817,705).

Front page only of EP 879,844 published on Nov. 25, 1998 (patent family member of A3 reference, U.S. patent 6,225, 366).

Front page only of EP 884,355 published on Dec. 16, 1998 (patent family member of A8 reference, U.S. patent 5,929, 127).

Dow Deutschland Product Information sheet for GREY-FOAM polyethylene foam plank published Apr. 1998.

* cited by examiner

*Primary Examiner*—Morton Foelak

(57) ABSTRACT

Thermoplastic polymer foams having sound deadening properties satisfactory for demanding applications are provided which have mechanical strength, which are economical to manufacture, and which are hydrolytically stable. Methods of preparing these foams are also provided. The foams are useful in sound management, cushion packaging, filtering, and fluid absorption and exhibit one or more of the following properties: 1) average cell size greater than about 2 mm; 2) substantially open-cell structure and 3) relatively large pores connecting the cells. In order that the foam be acoustically active, the foam should possess a substantially open-cell structure and a relatively low airflow resistivity. Foams with substantially open-cell structure and relatively low airflow resistivity are prepared by mechanically opening a foam having an average cell size greater than about 2 mm. In most cases, such mechanical opening creates relatively large pores connecting the cells.

45 Claims, 5 Drawing Sheets

"I"

"U"

"W"

PERFORATED FOAMS

This application is a 371 of PCT/US99/11754 filed May 27, 1999 which claims benefit of No. 60/100,699 filed Sep. 17, 1998.

The present invention relates to foams in general, and more particularly, to thermoplastic polymer foams useful in sound management.

In the construction industry, it is well known to use panels as partition walls in order to subdivide the building area into separate areas such as rooms and offices. Usually they consist of an insulating mineral fiber core, and two outer facing layers encompassing the core, and an air gap or hollow space. The insulating materials such as mineral fibers are arranged between the facing layers in such a manner so as to provide thermal and/or acoustic insulation. However, a major disadvantage of such partitions or panels having mineral fiber cores is the lack of mechanical strength of such fibers which therefore require a costly supporting structure or densification. In addition, mineral fiber products are unpleasant to handle causing skin irritation and possibly presenting a health hazard.

Foams have also been utilized as sound insulating materials. For example, WO 95/14136 discloses multilayered insulating panels or elements comprising, in a preferred embodiment, (a) two outer facing layers, and (b) a soft synthetic core material which is a single, continuous, soft, synthetic, closed-cell foam core layer having hollow profiles. The core material is arranged in intimate contact with both outer layers through contact points in alternate patterns, thereby providing gaps between the core layer and the opposing outer layer. However, the closed-cell foam utilized as the core layer in WO 95/14136 provides less than satisfactory sound insulation for demanding applications.

Although not wishing to be bound by any particular theory, the usefulness of a particular polymeric foam in sound management (for example, sound absorption and sound insulation) it is believed by the inventor of the present application to be dependent upon the foam having one or more of the following properties: 1) average cell size greater than about 2 mm; 2) substantially open-cell structure and 3) relatively large pore connecting the cells. In order that the foam be acoustically active, the foam should possess a substantially open-cell structure and a relatively low airflow resistivity. One or more of these same properties also are believed to contribute to the usefulness of a foam for filtering and fluid absorption.

Certain large pore, open-celled foams are known. However, they also possess one or more drawbacks. For example, thermoset resins such as melamine and semi-rigid polyurethane can be used to prepare foams which display the desired large pore, open-celled structure believed to be required for sound management. However, thermoset resins are not recyclable, are costly to manufacture, and are unsuitable for use in humid or wet environments due to their hydrolytic instability. Thermoplastic polymer foams are generally inexpensive to manufacture by a convenient extrusion process, are recyclable, and exhibit hydrolytic stability, and therefore offer an advantage over thermoset resins. However it is difficult to achieve a large-pore thermoplastic foam with an open-cell structure by a convenient direct extrusion process. These difficulties exist because cell opening and foam expansion contradict each other. That is, the growing cells within the foam must remain dosed in order to grow, but developing a large pore requires that a hole must develop on the cell wall shortly before the end of expansion.

In addition, although certain thermoplastic polymer foams are reported to be useful in sound management, it is questionable whether their sound management performance is satisfactory for a demanding application. (See, for example, DE 3,626,349 to Dynamit Nobel A G, published Feb. 11, 1988, DE 3,626,350 to Dynamit Nobel A G, published Feb. 11, 1988, and WO 95/14136, to Dow Chemical, published May 26, 1995).

Therefore, there remains a need in the art for foams which provide sound deadening properties satisfactory for demanding applications, which have mechanical strength, which are economical to manufacture, and which are hydrolytically stable.

That need is met by the present invention. Thus, the present invention provides thermoplastic polymer foams having sound deadening properties satisfactory for demanding applications, which have mechanical strength, which are economical to manufacture, and which are hydrolytically stable.

Thus, in one embodiment of the present invention, there is provided thermoplastic polymer foams having an average cell size greater than about 4 mm are provided.

In another embodiment, there is provided thermoplastic polymer foams having an average cell size of greater than about 2 mm wherein greater than about 50 percent of the cells have been opened by mechanical means are provided.

In yet another embodiment, the present invention provides a thermoplastic polymer foam having an airflow resistivity of less than about 800,000 Rayls/m and an average cell size of greater than about 2 mm, and wherein greater than about 50 percent of the cells have been opened by mechanical means.

In yet still another embodiment, the present invention provides processes for preparing thermoplastic polymer foam structures having an average cell size of greater than about 2 mm, and wherein greater than about 50 percent of the cells have been opened by mechanical means.

The foams of the present invention are particularly useful for sound absorption, sound insulation, fluid absorption, filtering, cushion packaging and other applications requiring one or more of the following properties: sound deadening or sound damping properties, mechanical strength, economical manufacture, and hydrolytically stability.

Figure 1:
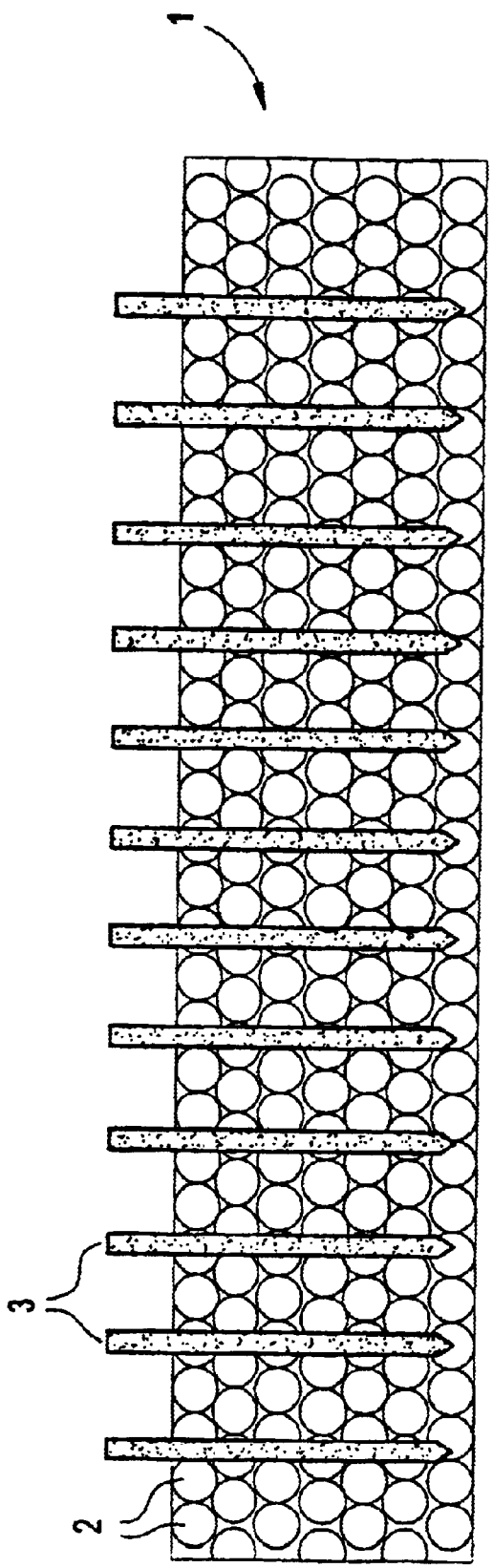
FIG. 1 depicts process for preparing a foam of the present invention wherein closed-cells within a foam are being opened by perforation.

The present invention provides thermoplastic polymer foams having sound deadening properties satisfactory for demanding applications, which have mechanical strength, are economical to manufacture, and which are hydrolytically stable. The foams of the present invention exhibit properties or combinations of properties which have heretofore been difficult, if not impossible, to achieve. Thus, the foams of the present invention exhibit one or more of the following properties: 1) average cell size greater than about 2 mm; 2) substantially open-cell structure and 3) relatively large pore connecting the cells.

In order that the foam be acoustically active, the foam should possess a substantially open-cells structure and a relatively low airflow resistivity. According to the present invention, foams with substantially open-cell structure and relatively low airflow resistivity are prepared by mechanically opening a foam having an average cell size greater than about 2 mm. In most cases, such mechanical opening creates relatively large pores connecting the cells.

Thermoplastic resins suitable for use in the present invention include all types of thermoplastic polymers and blends that are foamable by extrusion processes. Examples of thermoplastic polymer resins suitable for the present invention include, but are not limited to, polystyrenes and polyolefin resins, including polyethylene resins, polypropylene resins, as well as blends of ethylene-styrene interpolymer (ESI) resins with polyolefin resins, such as blends of polyethylene and ESI or polypropylene and ESI, with polyethylene resins, copolymers of polyethylene resins, and blends of polyethylene resins being preferred. Examples of such resins are low density polyethylene resins, such as those having a melt index of about 0.4 dg/minute and a density of 0.922 g/cm$^3$.

Preferred themoplastic resins also include olefinic polymers. Preferred olefinic polymers include ethylenic polymers, copolymers, and blends thereof.

The afore-mentioned ethylene-styrene interpolymer is a substantially random interpolymer comprising in polymerized form i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s).

The term "interpolymer" is used herein to indicate a polymer wherein at least two different monomers are polymerized to make the interpolymer.

The term "substantially random" is the substantially random interpolymer resulting from polymerizing i) one or more α-olefin monomers and ii) one or more vinyl or vinylidene aromatic monomers and/or one or more sterically hindered aliphatic or cycloaliphatic vinyl or vinylidene monomers, and optionally iii) other polymerizable ethylenically unsaturated monomer(s) as used herein generally means that the distribution of the monomers of said interpolymer can be described by the Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Preferably, the substantially random interpolymer resulting from polymerizing one or more α-olefin monomers and one or more vinyl or vinylidene aromatic monomers, and optionally other polymerizable ethylenically unsaturated monomer(s), does not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons. By the subsequently used term "substantially random interpolymer" is meant a substantially random interpolymer produced from the above-mentioned monomers.

Suitable α-olefin monomers which are useful for preparing the substantially random interpolymer include, for example, α-olefin monomers containing from 2 to 20, preferably from 2 to 12, more preferably from 2 to 8 carbon atoms. Particularly suitable are ethylene, propylene, butene-1,4-methyl-1-pentene, hexene-1 or octene-1 or ethylene in combination with one or more of propylene, butene-1,4-methyl-1-pentene, hexene-1 or octene-1. Most preferred are ethylene or a combination of ethylene with $C_{3-8}$-α-olefins. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the substantially random interpolymer include, for example, those represented by the following Formula I

(Formula I)

wherein $R^1$ is selected from radicals consisting of hydrogen and alky radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, t-butyl styrene, the ring halogenated styrenes, such as chlorostyrene, para-vinyl toluene or mixtures thereof. A more preferred aromatic monovinyl monomer is styrene.

The most preferred substantially random interpolymers are interpolymers of ethylene and styrene and interpolymers of ethylene, styrene and at least one α-olefin containing from 3 to 8 carbon atoms.

The substantially random interpolymers usually contain from 0.5 to 65, preferably from 1 to 55, more preferably from 2 to 50 mole percent of at least one vinyl or vinylidene aromatic monomer and/or sterically hindered aliphatic or cycloaliphatic vinyl or vinylidene monomer and from 35 to 99.5, preferably from 45 to 99, more preferably from 50 to 98 mole percent of at least one aliphatic α-olefin having from 2 to 20 carbon atoms. These interpolymers can be prepared according to WO98/10014 incorporated herein by reference.

Optionally, a nucleating agent may be added to the foamable blend. The amount of nucleating agent employed to prepare the foams of the present invention will vary according to the desired cell size, the foaming temperature, and the composition of the nucleating agent. For example, when a large foam size is desired, little or no nucleating agent should be used. Useful nucleating agents include calcium carbonate, barium stearate, calcium stearate, talc, clay, titanium dioxide, silica, barium stearate, diatomaceous earth, mixtures of citric acid and sodium bicarbonate. When utilized, the amount of nucleating agent employed may range from 0.01 to 5 parts by weight per hundred parts by weight of the polymer resin blend (pph).

Blowing agents useful in making the present foam include all types of blowing agents known in the art; physical and chemical blowing agents and mixtures thereof, including inorganic blowing agents, organic blowing agents, and chemical blowing agents. Suitable inorganic blowing agents include carbon dioxide, nitrogen, argon, water, air, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, and neopentane. Aliphatic alcohols include methanol, ethanol, n-propanol, and isopropanol. Fully and partially halogenated aliphatic hydrocarbons include chlorocarbons, fluorocarbons, and chlorofluorocarbons. Chlorocarbons for use in this invention include methyl chloride, methylene chloride, ethyl chloride, and 1,1,1-trichloroethane. Fluorocarbons for use in this invention include methyl fluoride, methylene fluoride, ethyl fluoride, 1,1-difluoroethane (HFC-152a), 1,1,1-trifluoroethane (HGC-143a), 1,1,1,2-tetrafluoroethane (HFC-134a), 1,1,2,2-tetrafluoroethane (HFC-134), pentafluoroethane, perfluoroethane, 2,2difluoropropane, 1,1,1-trifluoropropane, and 1,1,1,3,3-pentafluoropropane. Partially hydrogenated chlorofluorocarbons for use in this invention include chlorodifluoromethane (HCFC-22), 1,1-dichloro-1-fluoroethane (HCFC-141b), 1-chloro-1,1-difluoroethane (HCFC-142b), 1,1-dichloro-2,2,2-trifluoroethane (HCFC-123), and 1-chloro-1,2,2,2-tetrafluoroethane (HCFC-124). Fully halogenated chlorofluorocarbons may also be used but are not preferred for environmental reasons. Chemical blowing agents for use in this invention include azodicarbonamide, azodiisobutyronitrile, benzenesulfonylhydrazide, 4,4-oxybenzene sulfonyl-semicarbazide, p-toluene sulfonyl semicarbazide, N,N=-dimethyl-N,N=-dinitrosoterephthalamide, and trihydrazine triazine, sodium bicarbonate, mixtures of sodium bicarbonate and citric acid. Mixtures of all these blowing agents are also contemplated within the scope of this invention. Preferred blowing agents for the extrusion process and batch process for making moldable beads are physical blowing agents, with volatile organic blowing agents being preferred, with low hydrocarbons (for example, propane and butane) being most preferred. Preferred blowing agents for cross-linked foam processes are decomposable blowing agents and nitrogen, The amount of blowing agent incorporated into the polymer melt material to make a foaming gel is varied as required to achieve a predetermined density.

The foams of the present invention optionally further comprise an infrared absorber (transmission blocker) such as carbon black, graphite, or titanium dioxide, to enhance thermal insulating capability. When utilized, the infrared absorber may comprise between 1.0 and 25 weight percent and preferably between 2.0 and 10.0 weight percent, based upon the weight of the polymer blend in the foam. The carbon black may be of any type known in the art such as furnace black, thermal black, acetylene black, and channel black.

It is preferred that the foams of the present invention exhibit dimensional stability. A stability control agent may be especially desirable in producing thick (that is, greater than 4 mm) sheet and plank products (thicker than about 12 mm) of substantially closed-cell structure from the foregoing foams. In contrast, an additional stability control agent is probably not necessary or desirable when forming substantially open-celled foams.

Dimensional stability is measured by taking the foam volume during aging as a percentage of the initial volume of the foam, measured within 30 seconds after foam expansion. Using this definition, a foam which recovers 80 percent or more of the initial volume within a month is tolerable, whereas a foam which recovers 85 percent or more is preferred, and a foam which recovers 90 percent or more is especially preferred. Volume is measured by a suitable method such as cubic displacement of water.

Preferred stability control agents include amides and esters of $C_{10-24}$ fatty acids. Such agents are taught in U.S. Pat. Nos. 3,644,230 and 4,214,054. Most preferred agents include stearyl stearamide, glycerol monostearate, glycerol monobenenate, and sorbitol monostearate. Typically, such stability control agents are employed in an amount ranging from 0.1 to 10 parts per hundred parts of the polymer.

Various additives may also be incorporated in the foams such as inorganic fillers, pigments, antioxidants, acid scavengers, ultraviolet absorbers, flame retardants, processing aids, or extrusion aids.

The polymer foams of the present invention may be prepared by techniques and procedures well known to one of ordinary skill in the art and include extrusion processes as well as batch processes using a decomposable blowing agent and cross-linking, with extrusion processes being preferred.

In an extrusion process, the cell-size is affected by several parameters that include the type and level of blowing agent, the polymer type, the geometry of the die orifice, the shear rate at the die, the level of nucleating agent, the use of a cell enlarging agent, and the foaming temperature. In order to make the cell size large, the cell nucleating agent is normally not added. Instead, a cell enlarging agent may be added. Among the rest of the parameters, the type and level of blowing agent have the greatest effect on the cell size. Ordinarily, blowing agents having a relatively high solubility and a small molecular size at a relatively low level provide a large cell size. Examples of such blowing agents include propane, n-butane, isobutane, n-pentane, methyl chloride, methylene chloride, ethyl chloride, methanol, ethanol, dimethyl ether, water, and a mixed blowing agent containing one or more of these blowing agents. Branched ethylenic polymer resins prepared by the high-pressure free-radical method tend to provide large cells when expanded with these blowing agents. The cell size enlarging additives are, in general, those compounds that are used in plasticizing polymer resins. Examples of cell size enlargers include waxy materials having a relatively low melting point as are described in U.S. Pat. No. 4, 229,396, and non-waxy low molecular weight compounds as are disclosed in U.S. Pat. No. 5,489,407. In addition, a relatively low shear rate at the die orifice results in a large cell size.

The polymer foams of the present invention may be cross-linked or non-cross-linked. Processes for making polymer foam structures and processing them are taught in C. P. Park, *Polyolefin Foam,* Chapter 9, Handbook of Polymer Foams and Technology, edited by D. Klempner and K. C. Frisch, Hanser Publishers, Munich, Vienna, New York Bareelona (1991).

Non-crosslinked foams of the present invention may be made by a conventional extrusion foaming process. The foam structure is generally prepared by heating a thermoplastic polymer resin (that is, polymer material) to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art, such as with an extruder, mixer, blender, or the like. The blowing agent is mixed with the melt polymer material at an elevated pressure sufficient to prevent substantial expansion of the melt polymer material and to disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Non-crosslinked foams of the present invention may be formed in a coalesced strand form by extrusion of the thermoplastic polymer resin (that is, polymer material) through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are taught in U.S. Pat. Nos. 3,573,152 and 4,324,720.

The present foam structure may also be formed into non-cross-linked foam beads suitable for molding into articles. The foam beads may be prepared by an extrusion process or a batch process. In the extrusion process, the foam strands coming out of a multi-hole die attached to a conventional foam extrusion apparatus are granulated to form foam beads. In a batch process, discrete resin particles such as granulated resin pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is taught in U.S. Pat. Nos. 4,379,859 and 4,464,484.

Cross-linked foams of the present invention may be prepared by either the cross-linked foam process employing a decomposable blowing agent or by conventional extrusion processes.

When utilizing the cross-linked foam process employing a decomposable blowing agent, crosslinked foams of the present invention may be prepared by blending and heating the thermoplastic polymer resin (that is, polymer material) with a decomposable chemical blowing agent to form a foamable plasticized or melt polymer material, extruding the foamable melt polymer material through a die, inducing cross-linking in the melt polymer material, and exposing the melt polymer material to an elevated temperature to release the blowing agent to form the foam structure. The polymer material and the chemical blowing agent may be mixed and the melt blended by any means known in the art such as with an extruder, mixer, blender, or the like. The chemical blowing agent is preferably dry-blended with the polymer material prior to heating the polymer material to a melt form, but may also be added when the polymer material is in melt phase. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer is extruded or conveyed through a die of desired shape to form a foamable structure. The foamable structure is then cross-linked and expanded at an elevated or high temperature (typically, 150° C. to 250° C.) such as in an oven to form a foam structure. When radiation cross-linking is used, the foamable structure is irradiated to cross-link the polymer material, which is then expanded at the elevated temperature as described above. The structure can advantageously be made in sheet or thin plank form according to the above process using either cross-linking agents or radiation.

In addition to use of a cross-linking agent or radiation in the cross-linked foam process employing a decomposable blowing agent, cross-linking may also be accomplished by means of silane cross-linking as described in C. P. Park, Supra, Chapter 9.

Cross-linked foams of the present invention may also be made into a continuous plank structure by an extrusion process utilizing a long-land die as described in GB 2,145,961A. In that process, the polymer, decomposable blowing agent, and cross-linking agent are mixed in an extruder; the mixture is heated to permit the polymer to cross-link and the blowing agent to decompose in a long-land die; and foam structure is shaped and conducted away from the die, with the foam structure and the die contact being lubricated by a proper lubrication material.

Cross-linked foams of the present invention may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. In another version of the process, the polymer beads are impregnated with blowing agent cooled down, discharged from the vessel, and then expanded by heating or with steam. In a derivative of the above process, styrene monomer may be impregnated into the suspended pellets along with the cross-linking agent to form a graft interpolymer with the polymer material. Blowing agent may be impregnated into the resin pellets while in suspension, or alternatively, in a non-hydrous state. The expandable beads are then expanded by heating with steam and molded by a conventional molding method for the expandable polystyrene foam beads.

The foam beads may then be molded by any means known in the art, such as charging the foam beads to the mold, compressing the mold to compress the beads, and heating the beads such as with steam to effect coalescing and welding of the beads to form the article. Optionally, the beads may be pre-heated with air or other blowing agent prior to charging to the mold. Excellent teachings of the above processes and molding methods are found in C. P. Park, Supra, pp. 227–233, U.S. Pat. Nos. 3,886,100; 3,959, 189; 4,168,353, and 4,429,059. The foam beads can also be prepared by preparing a mixture of polymer, cross-linking agent, and decomposable mixtures in a suitable mixing device or extruder and forming the mixture into pellets, and heating the pellets to cross-link and expand.

Another process for making cross-linked foam beads suitable for molding into articles to melt the polymer material and mix it with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings of this process are found in U.S. Pat. No. 3,616, 365 and C. P. Park, Supra, pp. 224–228.

In addition, silane cross-linking technology may be employed in the extrusion process. Teachings of this process are found in C. P. Park, Supra, Chapter 9 and in U.S. Pat. No. 4,714,716. When silane cross-linking processes are utilized with conventional extrusion processes, a polymer is grafted with a vinyl functional silane or an azido functional silane and extruded to form foams. The extruded foams are then exposed to warm humid air for the cross-linking to develop.

The cross-linked foams of the present invention may be made in bun stock form by mixing the polymer material, a cross-linking agent, and a blowing agent to form a slab, heating the mixture in a mold so the cross-linking agent can cross-link the polymer material and the blowing agent can decompose, and expanding the foam by release of pressure in the mold. Optionally, the bun stock formed upon release of pressure may be re-heated to effect further expansion.

Cross-linked polymer sheet is made by irradiating a polymer sheet with a high energy beam or by heating a polymer sheet containing a chemical cross-linking agent. The cross-linked polymer sheet is cut into the desired shapes and impregnated with nitrogen under high pressure and at a temperature above the softening point of the polymer. Releasing the pressure effects nucleation of bubbles and some expansion in the sheet. The sheet is reheated in a low pressure vessel under pressure above the softening point, and the pressure is released so that the foam can expand.

Foams prepared by the above-methods exhibit densities of from 10 kg/m$^3$ to 300 kg/m$^3$, with foams having densities of from 15 kg/m$^3$ to 100 kg/m$^3$ being preferred, and foams having densities of from 15 kg/m$^3$ to 60 kg/m$^3$ being particularly preferred. In addition, foams prepared by the above-methods exhibit an average cell size of from 2 mm to 15 mm, with cell sizes of from 2 mm to 10 mm being preferred, from 3 mm to 10 mm being more preferred, and from 4 mm to 8 mm being particularly preferred. In one preferred embodiment, the cellular thermoplastic polymer foam has an average cell diameter greater than 4 mm. In addition, the foams prepared by the above-methods may be open or closed celled.

Foams prepared according to the above-methods may be useful in sound management without additional process steps. For example, foams prepared by the above-methods having an average cell size greater than about 4 mm may exhibit a sufficiently low airflow resistivity to be suitable for use as a sound absorption material irrespective of other properties which the foam may possess and without the need for additional process steps. Typically, for sound management end-uses, airflow resistivities of less than about 800, 000 Rayls/m (that is, 800,000 Pa.s/m$^2$) is desirable, with less than 400,000 Rayls/m (that is, 400,000 Pa.s/m$^2$), less than 100,000 Rayls/m (that is, 100,000 Pa.s/m$^2$), and less than 50,000 Rayls/m (that is, 50,000 Pa.s/m$^2$) being increasingly more desirable depending upon the end-use of the foam.

However, in the event that the base foams prepared by the above methods do not exhibit sufficient sound management properties, the addition or enhancement of properties such as 1) substantially open-cell structure and 2) relatively large pores connecting the cells, may be imparted to the base foam by opening closed-cells within the base foam by mechanical means.

As stated previously, in order that the foam be acoustically active, the foam should possess a substantially open-cell structure and a relatively low airflow resistivity. According to the present invention, foams with substantially open-cell structure and relatively low airflow resistivity are prepared by mechanically opening a foam having an average cell size greater than about 2 mm. In most cases, such mechanical opening creates relatively large pores connecting the cells. For example, closed-cells within the foam may be opened by applying a means for opening closed-cells in a cellular thermoplastic polymer foam to at least some portion of at least one surface of base thermoplastic polymer foam, such application being sufficient to result in at least some portion of closed-cells within the base polymer foam being opened. The portion of closed-cells opened by the mechanical means will of course depend upon the extent of the application of the means for opening the closed-cells. For example, if a smaller percentage of closed-cells are to be opened, the application of the means for opening will be applied to only a portion of the surface of the base foam and/or extend only partially through the thickness of the base foam. However, if a larger percentage of closed-cells are to be opened, the application of the means for opening will be applied to more of the surface of the bass foam and/or extend farther into the thickness of the base foam.

The direction of the application of the means for opening closed-cells is immaterial and may be performed either perpendicular to or with the direction of extrusion and may be performed at any angle with respect to the surface of the base foam.

The means for opening closed-cells may be any means sufficient to open closed-cells, but will typically include perforation, slicing, compression, or combinations thereof. Typically, perforation comprises puncturing the base foam with one or more pointed, sharp objects. Suitable pointed, sharp objects include needles, spikes, pins, or nails. In addition, perforation may comprise drilling, laser cutting, high pressure fluid cutting, air guns, or projectiles. FIG. 1 depicts a cross-section of a base foam 1 of the present invention comprised of a multiplicity of closed-cells 2, foam 1 being perforated with a multiplicity of pointed, sharp objects 3.

Figure 2:
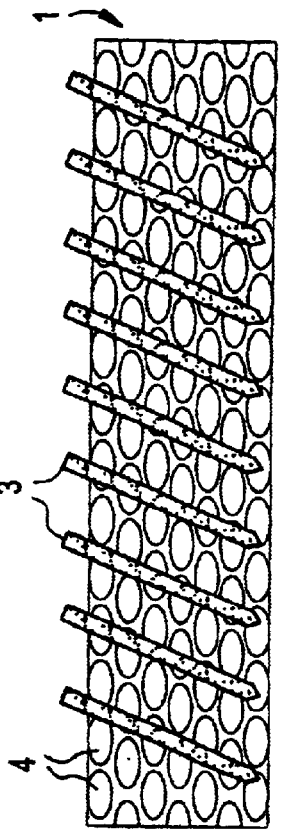
FIG. 2 depicts a process for preparing a foam of the present invention wherein elongated closed-cells within a foam are being opened by perforation.
Figure 3:
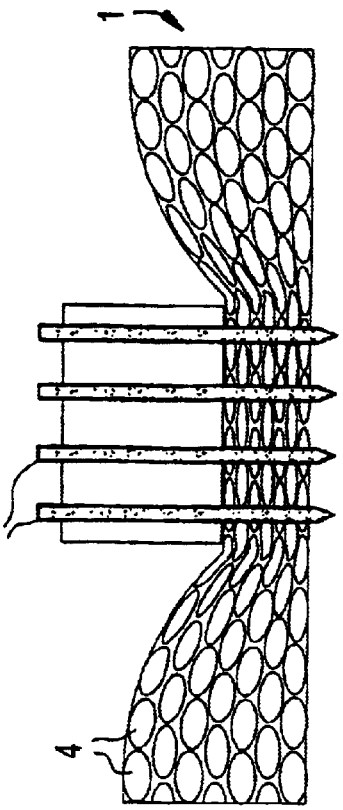
FIG. 3 depicts a process for preparing a foam of the present invention wherein elongated closed-cells within a foam are being opened by perforation at an oblique angle.

In addition, the base foam may be prepared to have elongated cells by pulling the foam strand during expansion. Such pulling results in elongated cells without changing or often, increasing the cell size in the horizontal direction. Thus, pulling results in an increased average cell size in the direction perpendicular to the vertical direction (EH average) and facilitates perforation. FIG. 2 depicts a cross-section of a base foam 1 of the present invention comprised of a multiplicity of closed-cells which have been elongated in the direction of extrusion 4 which have then been perforated with a multiplicity of pointed, sharp objects 3. FIG. 3 depicts a cross section of a base foam 1 of the present invention comprised of a multiplicty of closed-cells which have been elongated in the direction of extrusion 4 which have then been perforated with a multiplicity of pointed, sharp objects 3 at an oblique angle.

Perforation of the base foam may be performed in any pattern, including square patterns and triangular patterns. In addition, it is preferred that the distance between perforations be on the order of the cell size within the foam in order to perforate the majority of cells. Therefore, when it is desired that a majority of cells be perforated, it is preferred that the perforation is performed in a manner which results in the perforations being spaced one from another at distances which are no greater than two times the average diameter of the cells within the base foam, preferably no greater than 1.5 times, more preferably equal to the average diameter of the cells within the base foam, and most preferably, less than the average diameter of the cells within the base foam. Although the choice of a particular diameter of the sharp, pointed object with which to perforate the base foam is dependent upon many factors, including average cell size, intended spacing of perforations, pointed, sharp objects useful in the preparation of certain foams of the present invention will typically have diameters of from 1 mm to 4 mm.

Slicing may be performed by any means sufficient to slice through at least a portion of foam, and includes knives, and saws. Opening cells of the base foam by slicing necessarily only opens those cells at the cut surface, leaving the cells in the interior of the foam unchanged. Therefore, slicing does not reduce the airflow resistivity throughout the thickness of the foam. However, opening surface cells by slicing may be sufficient for certain sound management applications, especially if the cell size is sufficiently large and/or the remaining uncut foam is sufficiently thin. Although not wishing to be bound by any particular theory, it is believed by the inventor of the present application that for effective sound absorption, it is not required that there be low airflow resistivity throughout the thickness of the foam. This is because sound is a compression wave of air which propagates by movement of air molecules in an oscillatory manner (that is, the air molecules move back and forth at a fixed average location, hitting molecules in the adjacent layer of air and so on). The air molecules themselves do not move a great distance to the end of the foam thickness. Thus, there is no real airflow during sound transmission through a foam substrate. However, sound is dissipated by the heat which is formed by the movement of air molecules back and forth, causing friction at the cell walls. Being a compressive wave, the sound wave passes through a soft film blocking its passage since the impingement of the molecules on a film in a generally perpendicular direction to their movement causes the film to vibrate which in turn makes the air on the other side oscillate. Thus, a few thin layers of flexible thin films, such as the unchanged interior core of a foam of the present invention whose surface cells have been sliced, do not excessively hurt the sound absorption capability of the foam.

Compression as a means of opening cells may be performed by any means sufficient to exert external force to one or more surfaces of the foam, and thus cause the cells within the base foam to burst and open. Compression during or after perforation is especially effective in rupturing the cell walls adjacent to the channels created by perforation since a high pressure difference across the cell walls can be created. In addition, unlike needle punching, compression can result in rupturing cell walls facing in all direction, thereby creating tortuous paths desired for sound absorption.

The mechanical opening of closed-cells of the base foam lowers the airflow resistivity of the base foam by creating largesize pores in the cell walls and struts. In any event, regardless of the particular means by which it does so, such mechanical opening of closed-cells within the base thermoplastic polymer foam serves to enhance the sound absorption, sound insulation, fluid absorption, and filtering properties of the foam.

Figure 4:
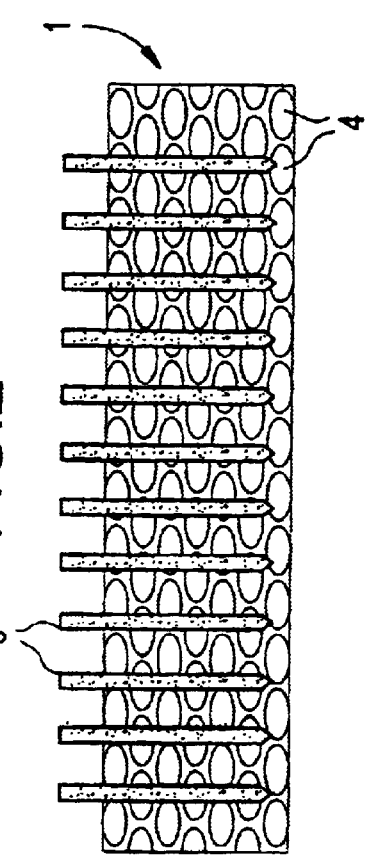
FIG. 4 depicts a process for preparing a foam of the present invention wherein closed-cells within a foam are opened by compression followed by perforation.

Of course, the percentage of cells opened mechanically will depend on a number of factors, including cell size, cell shape, means for opening (that is, perforation, slicing, compression), and the extent of the application of the means for opening applied to the base foam. For maximum reduction in airflow resistivity, it is preferred that greater than 50 percent of the closed-cells within the base foam be opened by the mechanical means described above, with greater than 70 percent being more preferred, and greater than 90 percent being most preferred. In order to maximize the percentage of cells opened mechanically, it is preferred that a combination of compression and perforation be used to open the cells. FIG. 4 depicts a cross-section of a base foam 1 of the present invention comprised of a multiplicity of closed-cells which have been elongated in the direction of extrusion 4 which have been first compressed, and then while the foam is compressed, perforated with a multiplicity of pointed, sharp objects 3.

In addition to the option of including a fire retardant in the polymer material prior to extrusion as discussed previously, the foams of the present invention may also be impregnated with a fire retardant after they have been extruded, and preferably after they have been subjected to any additional process steps, such as elongation by pulling and mechanical opening of closed-cells.

When used in sound insulation, the foams of the present invention may be used as the core layer in a multilayered, sound insulating panel comprised of a facing layer, the foam core layer attached thereto, and a structure to which the core layer is fixed at separated contact points by means of stripes, patches, dabs, or other geometrical protrusions (generally called contact points hereafter), leaving gaps between the core layer and the structure, and in the case of long spans and/or thin facing layers, travel stops to keep the core layer at a certain distance from the structure. The structure, to which the core layer is fixed at separated contact points, can be a wall or a ceiling or any other suitable constructional element. Alternatively, the structure can be a second facing layer. The resulting sandwich panel can be used as a partition element or partition wall. The panels are useful in construction and other industries for improving sound insulation properties of buildings and/or machinery. Examples of such panels are described in WO 95/14136, published May 26, 1995.

Figure 9:
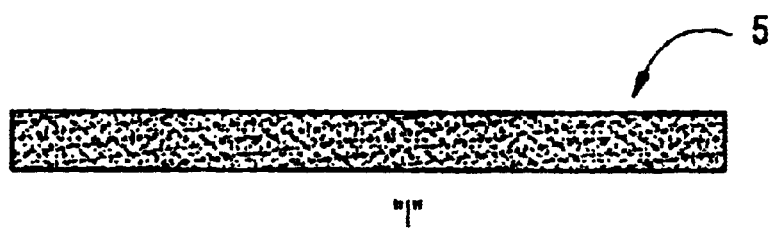
FIG. 9 depicts a profile of a foam of the present invention, which profile is designated I.
Figure 10:
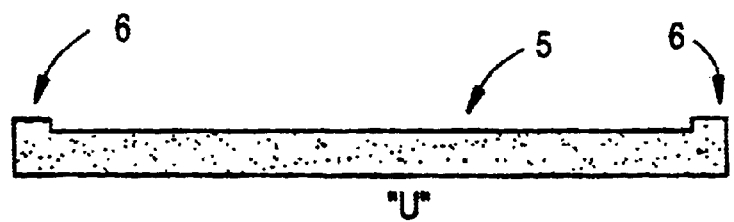
FIG. 10 depicts a profile of a foam of the present invention, which profile is designated U.
Figure 11:
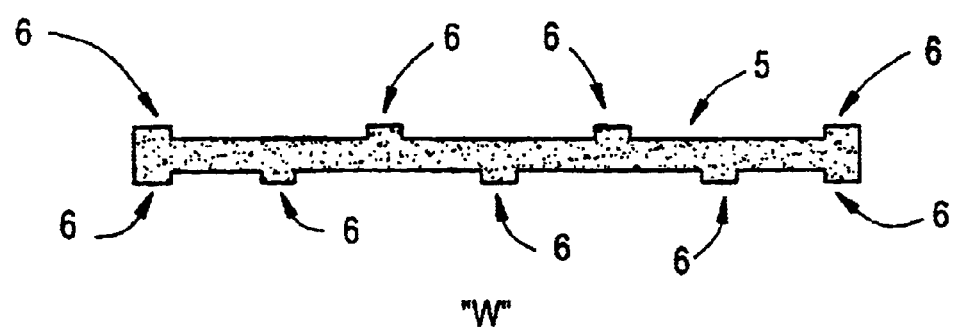
FIG. 11 depicts a profile of a foam of the present invention, which profile is designated W.

When used as a core layer in a multilayered panel, the foams of the present invention may be formed into a profile in any number of ways. For example, the foams of the present invention may be profiled into a straight configuration. FIG. 9 depicts a foam of the present invention profiled such that it is comprised of a foam core 5 which is in the form of a straight configuration, designated 1. However, the foams of the present invention may also be profiled such that they exhibit a low dynamic stiffness. For example, the foams of the present invention may be profiled such that they are comprised of a foam core 5 to which narrow strips of the same or another foam 6 have been attached on the same side at both ends of the foam core 5. The profile of FIG. 10 is designated U. In addition, the foams of the present invention may be profiled such that they are comprised of a foam core 5 to which narrow strips of the same or another foam 6 are attached alternately on opposite sides of the foam core 5 and narrow strips of the same or another foam 6 have been attached on both sides and opposite one another at both ends of the foam core 5. The profile of FIG. 11 is designated W. When the foam of the present invention is so profiled and placed between facer panels, these designs transform the compressive strain to the facer panel to a flexural strain to the foam core. Given a sufficient distance between the supporting strips, the structure provides the desired very low dynamic stiffness. In the case of profile W, the distances between the middle points of narrow strips 6 on the same side of the foam core 5 are at least 250 mm, and preferably, between 300 mm and 600 mm. In the case of profile U, distances between the middle points of the strips are at least 350 mm, and preferably, between 450 mm to 600 mm.

The following examples of foams of the present invention are not to be construed as limiting. Unless otherwise indicated, all percentages, parts, and proportions are by weight

EXAMPLE 1

This Example illustrates foams to be used in this invention and a method of preparing the foams by an extrusion process. The foams as listed in Table I were prepared using a commercial foam extrusion apparatus. The apparatus was a screw-type extruder having two additional zones for mixing and cooling at the end of the usual sequential zones for feeding, melting, and metering. An opening for blowing agent injection was provided on the extruder barrel between the metering and mixing zone. At the end of the cooling zone, there was attached a die orifice having an opening of generally rectangular shape.

A low density polyethylene having a melt index of about 0.4 dg/minute (according to ASTM D-1238, 190° C./2.16 kg) and a density of 0.922 g/cm$^3$ was fed into the extruder together with a small amount of glycerol monostearate at a uniform rate. No nucleating agent was added in order to keep the cell size large. The temperatures maintained at the extruder zones were 160° C. at the feeding zone, 200° C. at the melting zone, 210° C. at the metering zone, and 190° C. at the mixing zone. Isobutane was injected into the mixing zone at a uniform rate of 11.8 parts per hundred parts (pph) of polymer. The temperatures of the cooling zone and the die block were gradually lowered to produce a good foam. At a cooling zone temperature of 110° C. and a die temperature of 108° C., a substantially closed-cell foam of about 23 kg/m$^3$ density and a large cell size was obtained. The foam, which was about 105 mm in thickness and about 600 mm in width, was saved (PEF1) and then pulled to reduce its thickness to approximately 80 mm, and the pulled foam was also saved (PEF2). By pulling, it was intended to enlarge the cells in the direction perpendicular to the vertical direction. As shown in Table I, the pull not only elongated cells in the extrusion direction but also increased the average cell size. A large cell size in the direction perpendicular to the vertical direction (EH average) facilitates hole punching.

TABLE I

| Foam Desig. | Foam Density (kg/m$^3$) | Cell Size Extr. (mm)[2] | Cell Size Vert. (mm)[1] | Cell Size EH Av. (mm)[4] | Cell Size 3D Av. (mm)[5] |
|---|---|---|---|---|---|
| PEF1 | 23 | 6.2 | 5.9 | 5.5 | 5.7 | 5.9 |
| PEF2 | 23 | 5.8 | 6.3 | 6.5 | 6.4 | 6.2 |
| PEF3 | 32 | 4.9 | 4.0 | 4.3 | 4.2 | 4.4 |
| PEF4 | 23 | 2.9 | 2.1 | 2.3 | 2.2 | 2.4 |
| PEF5* | 40 | 1.9 | 1.7 | 1.5 | 1.6 | 1.7 |

*not an Example foam of this invention.
[1]Cell size in vertical direction as determined per ASTM D-3756.
[2]Cell size in extrusion direction as determined per ASTM D-3756.
[3]Cell size in horizontal direction as determined per ASTM D-3756.
[4]Average cell size in extrusion and horizontal direction.
[5]Average cell size in all three directions.

Other polyethylene foams (PEF) listed in Table 1 were prepared by essentially the same procedure as described for PEF1 and PEF2. The isobutane level was varied for each foam produced to achieve the desired density and a small amount of a nucleating agent was added for cell size control. All the foams had a substantially closed-cell structure.

Test 1
Hole Punching Tests

The foams were sliced into slabs of about 55 mm in thickness, and holes were punched through the foam slabs in a square pattern of a predetermined spacing. For punching holes in 10, 5, and 4 mm spacing, a 2 mm-diameter needle was employed. The 3 mm-spaced holes were punched with a punching plate having a multiplicity of 1.5 mm needles secured in the desired pattern. The degree of hole punching may be conveniently expressed by the hole density (that is, number of holes per square centimeter). Punching in a 10, 5, 4, and 3 mm square pattern results in a hole density of 1, 4, 6.25 and 11.1 holes/cm$^2$, respectively. From each foam sample a cylindrical specimen of 29 mm diameter was bored out to the entire thickness of 55 mm and the open-cell content of the specimen was determined per ASTM D-2856 Procedure C. The open-cell data are summarized in Table 11 for each foam specimen and punching pattern.

TABLE II

| Foam Type | No. Holes[1] | Surface Open-Cell[2] | 10 mm Spacing[3] | 5 mm Spacing[4] | 4 mm Spacing[5] | 3 mm Spacing[6] |
|---|---|---|---|---|---|---|
| PEF1 | 63 | 55 | 84 | 90 | 94 | 95 |
| PEF2 | 77 | 59 | 81 | 94 | 95 | 95 |
| PEF3 | ND | 41 | 53 | 82 | 87 | 95 |
| PEF4 | ND | 23 | 61. | 71 | 78 | 92 |
| PEF5* | ND | *18 | *30 | *47 | *66 | *72 |

*not an Example foam of this invention.
[1]Open-cell content of as-extruded foams in percent ND = not determined.
[2]The volume of the cut surface cells as a percentage of the foam volume (per ASTM D-2856).
[3]Open-cell content of foam body hole-punched in 10 mm spacing in percent.
[4]Open-cell content of foam body hole-punched in 5 mm spacing in percent.
[5]Open-cell content of foam body hole-punched in 4 mm spacing in percent.
[6]Open-cell content of foam body hole-punched in 3 mm spacing in percent.

The data clearly indicated that the larger the cells, the easier it was to develop open-cells by hole punching. In order to punch a majority of the cells, the hole spacing needed to be equivalent to or smaller than the cell size. Since punching holes to the greater density was the more costly, a foam having the larger cell size was preferred. Punching one hole per square centimeter is commercially practiced on certain foams having cell size less than 2 mm. Four holes per square centimeter can be readily applicable. Punching greater than 4 holes per square centimeter may not be impossible, but is difficult in practice. In addition, the specimen of a macrocellular foam (for example, PEF1 and PEF2), without hole punching, already had a high level of open cells developed. Much of the high open-cell content comes from the cut surface cells of the specimen. For example, the surface cut cells of PEF2 amounted to about 59 percent out of the total 77 percent open-cell content of the foam.

Test 2
Compression Test

Foam PEF1 from Example 1 was first punched with a 2 mm-diameter needle in a 5 mm by 5 mm square pattern. The punched foam had an open-cell content of approximately 93.5 percent (as determined by ASTM D-2856 Procedure C). A foam specimen of 11 cm by 11 cm cross-section and 7 cm in thickness was cut from the foam plank and compressed in the thickness direction using a press until the thickness became 5 mm. During the compression, a popping sound indicating cell breakage was heard. The open-cell content of the foam increased to 96.7 percent, which is close to the maximum possible open-cell content of the foam (that is, about 97 percent). Evidently, most of the remaining closed-cells were burst open by compression.

Test 3
Airflow Test

This test showed that larger flow channels were more readily created by punching holes in a larger-celled foam than a smaller-celled foam. The apparatus used in this test was an airflow tester similar to those described in ASTM D-3574 and ISO 9053 (Method A). It consisted of an air piston of 10 cm inside diameter which was driven by the drive of an instron tester, a sample holder made of a plastic pipe of 7 cm inside diameter and a cap, a water manometer and assorted connecting tubes. Air was pumped at a fixed rate through a specimen loaded in the holder and the pressure drop across the specimen was measured using the manometer.

In practice, three foams of different cell sizes were selected in this test: two polyethylene foams prepared in Example 1 PEF4 and PEF5, and a polypropylene foam. The polypropylene foam was a coalesced strand foam prepared on a foam extrusion line having a similar configuration as one in Example 1 using a die having multiple holes. The polypropylene foam (PPF) had a cell size (3D average) of about 0.4 mm, a density of approximately 17 kg/m³, and an open-cell content of 84 percent (ASTM D-2856 Procedure A). The foams were sliced parallel to the extrusion direction to 35 mm-thick slabs. A 6.4 cm-diameter circular specimen was cut out of the slab and loaded in the sample holder. A caulking material was used to seal off the edges against the pipe surface. First, the pressure drop across the specimen was measured at a slow air rate (at a piston speed in the order of 1 to 1.5 mm/minute) to ensure a proper sealing at the edges and to determine the airflow resistance of the nascent foam. Then, a hole was punched through the foam specimen with a needle of predetermined diameter, and the pressure drop at an appropriate flow rate was measured. The procedure was continued until 9 holes were punched into the specimen. The airflow per hole was calculated from the slope of the regression line between the airflow per unit pressure gradient (pressure drop/thickness of the specimen) and the number of holes. The airflow indicated how well air flows through a hole. The airflow data for foam specimens punched with 2, 3 and 4 mm needles are summarized in Table III in units of $m^4$/GPa.s (cubic meter per giga Pascal/meter per second). For a given needle size the larger-celled foam developed the higher airflow holes than the smaller-celled foam. In addition the larger needle developed the higher-airflow holes for all foams than the smaller needle. The effect of the needle size on the airflow was greater with a foam having the larger cell size.

TABLE III

| | Airflow | | |
|---|---|---|---|
| Foam Type | 2 mm Needle ($m^4$/GPa·s)[1] | 3 mm Needed ($m^4$/GPa·s)[2] | 4 mm Needle ($m^4$/GPa·s)[3] |
| PEF4 | 0.23 | 1.0 | 2.7 |
| PEF5 | 0.17 | 0.72 | 1.2 |
| *PPF | 0.17 | 0.46 | 0.49 |

*Not an Example of this invention.
[1]Airflow through a hole punched with a 2 mm needle through foam body.
[2]Airflow through a hole punched with a 3 mm needle through foam body.
[3]Airflow through a hole punched with a 4 mm needle through foam body.

Test 4
Comparison of Airflow Resistivity and Sound Absorption Among Foams of Varying Cell Size The apparatus used in this Example is a Model 4206 acoustical impedance tube and Model 3555 signal analyzer, both supplied by Brueel and Kjaer A/S, Naerum, Denmark. This apparatus is used to measure a normal incidence sound absorption coefficient of a foam according to the method described in ASTM E-1050. In practice, specimens of 29 mm in diameter and 35 mm in thickness were bored out of the foams used in Test 3. Seven holes were punched into a specimen in the thickness direction using a needle of a chosen diameter. The holes were approximately equally spaced in a triangular pattern with one of them punched at the center and the rest at the corners of a hexagon enhaving 9 mm sides. The hole density is calculated to be approximately 1.06 holes/cm². Needles of 2, 3 and 4 mm diameter were employed. The nascent foam with no holes was also tested for comparison. The specific airflow resistance of the specimens of hold-punched foams was calculated from the per-hole airflow shown in Table III. The specific airflow resistance of the nascent foams was measured directly. The specific airflow resistance and the sound absorption coefficients are summarized in Table IV.

TABLE IV

| Test Type | Foam Type | Needle Size (mm)[1] | Specific Airflow Resistance (1000 Rayls)[2] | Sound Absorption Coefficient | | | | |
|---|---|---|---|---|---|---|---|---|
| | | | | 500 Hz[3] | 1000 Hz[4] | 2000 Hz[5] | Maximum[6] | Freq. (Hz)[7] |
| 4.1* | PEF4 | None | 4056 | 0.11 | 0.11 | 0.16 | NE | NE |
| 4.2 | PEF4 | 2 | 14.4 | 0.42 | 0.34 | 0.28 | 0.50 | 700 |

TABLE IV-continued

| Test Type | Foam Type | Needle Size (mm)[1] | Specific Airflow Resistance (1000 Rayls)[2] | Sound Absorption Coefficient ||||  |
|---|---|---|---|---|---|---|---|---|
| | | | | 500 Hz[3] | 1000 Hz[4] | 2000 Hz[5] | Maximum[6] | Freq. (Hz)[7] |
| 4.3 | PEF4 | 3 | 3.2 | 0.31 | 0.53 | 0.68 | 0.75 | 800 |
| 4.4 | PEF4 | 4 | 1.2 | 0.29 | 0.63 | 0.52 | 0.83 | 810 |
| 4.5* | PEF5 | None | 4718 | 0.05 | 0.06 | 0.09 | NE | NE |
| 4.6* | PEF5 | 2 | 19.4 | 0.13 | 0.07 | 0.14 | 0.16 | 350 |
| 4.7* | PEF5 | 3 | 4.6 | 0.29 | 0.13 | 0.19 | 0.30 | 480 |
| 4.8* | PEF5 | 4 | 2.9 | 0.32 | 0.20 | 0.21 | 0.33 | 540 |
| 4.9* | PPF | None | 2926 | 0.05 | 0.06 | 0.09 | NE | NE |
| 4.10* | PPF | 2 | 20.0 | 0.14 | 0.09 | 0.11 | 0.23 | 280 |
| 4.11* | PPF | 3 | 7.2 | 0.25 | 0.12 | 0.15 | 0.31 | 350 |
| 4.12* | PPF | 4 | 6.7 | 0.42 | 0.21 | 0.18 | 0.43 | 580 |

*Not an Example of this invention.
[1]The size of the needle used to punch holes.
[2]Specific flow resistance of the 35 mm-thick specimen measured in thousand Rayls.
[3]Sound absorption coefficient at a frequency of 500 Hz determined per ASTM E-1050.
[4]Sound absorption coefficient at a frequency of 1000 Hz determined per ASTM E-1050.
[5]Sound absorption coefficient at a frequency of 2000 Hz determined per ASTM E-1050.
[6]The maximum sound absorption coefficient at a frequency below 1600 Hz; NE = not existing.
[7]The frequency where the maximum absorption occurs.

Figure 5:
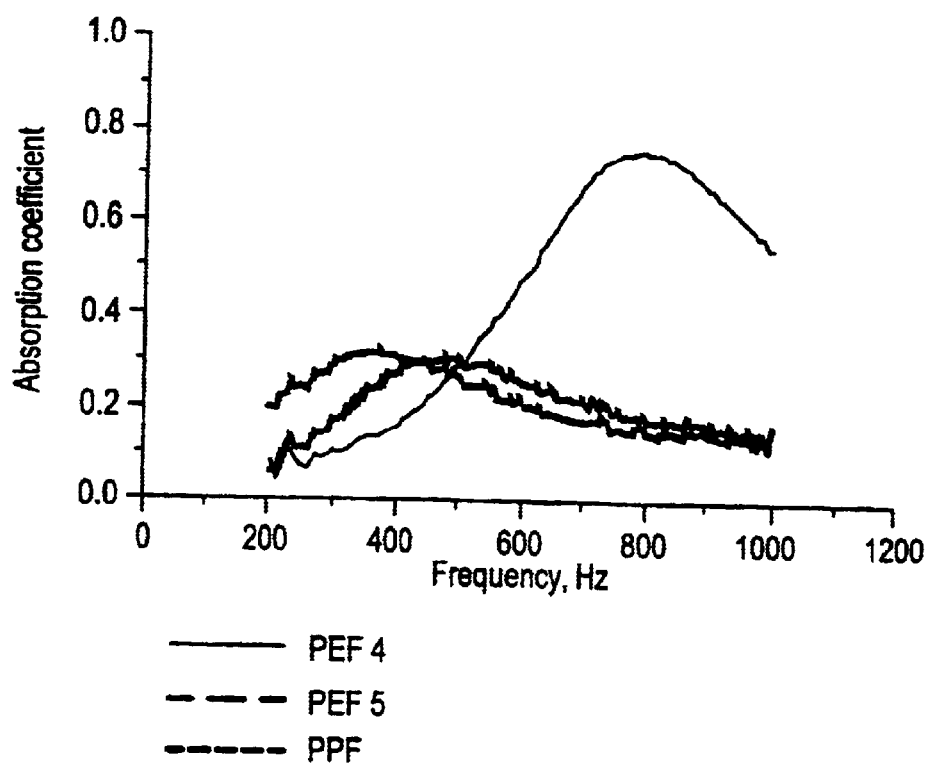
FIG. 5 depicts a sound absorption curve of a foam of the present invention.

All nascent foams have a very high specific airflow resistance and hole punching dramatically reduces the airflow resistance. Again, the larger the cells the foam had and the larger the needles used, the greater the reduction in the specific airflow resistance. The nascent foams absorb sound poorly. Clearly, the hole-punched foams absorb sound better than the nascent foams. In general, the smaller the specific airflow resistance, the greater the sound absorption coefficient the foam had. The sound absorption curves of the hole-punched foams generally look like those shown in FIG. 5, where foams punched with a 3 mm-diameter needle are compared. The sound absorption curve goes through a maximum at a frequency below 1000 Hz, declines and then goes through several humps in the measurement frequency range of 6400 Hz. Since the sound absorption characteristics below 2000 Hz, and more importantly, those below 1000 Hz, are of primary importance, those data are represented in Table IV and FIG. 5. In FIG. 5, the large-celled PEF4 foam (Test No. 4.3) absorbs the sound far better than the smaller-celled PEF5 (Test No. 4.7) and PPF (Test No. 4.11) even though the foam specimens were punched with the same needle at the same hole density. The difference in the sound absorption capability does not solely come from the difference in the specific airflow resistance. For example, foam PEF5 punched with a 4 mm needle absorbed sound far worse than foam PEF4 punched with a 3 mm needle even though the former had the lower specific airflow resistance than the later. It can be deduced from Test 1 that the larger-celled foam sees the greater of its volume opened up by hole punching than the smaller-celled foam.

Test 5

Comparison of Open-Cell Content and Sound Absorption Among Foams of Large Cell Size The effect of hole spacing on the sound absorption and open-cell content was investigated in this test. The large-celled foams as prepared in Example 1, nascent and hole-punched, were subjected to the sound absorption test as in Test 4. Specimens were the same as used in open-cell test in Example 1 except that their lengths were shortened to approximately 35 mm. The data are summarized in Table V.

TABLE V

| Test No. | Foam Type | Needle Spacing (mm)[1] | Open-Cell Content (%)[2] | Sound Absorption Coefficient ||||  |
|---|---|---|---|---|---|---|---|---|
| | | | | 500 Hz[3] | 1000 Hz[4] | 2000 Hz[5] | Maximum[6] | Freq. (Hz)[7] |
| 5.1 | PEF2 | None | 77 | 0.46 | 0.66 | 0.58 | 0.95 | 730 |
| 5.2 | PEF2 | 10 | 81 | 0.35 | 0.79 | 0.72 | 0.98 | 820 |
| 5.3 | PEF2 | 5 | 84 | 0.14 | 0.65 | 0.69 | 0.87 | 1280 |
| 5.4 | PEF2 | 4 | 95 | 0.13 | 0.63 | 0.61 | 0.85 | 1290 |
| 5.5 | PEF2 | 3 | 95 | 0.29 | 0.72 | 0.69 | 0.93 | 1360 |
| 5.6 | PEF3 | None | ND | 0.31 | 0.47 | 0.49 | 0.72 | 730 |
| 5.7 | PEF3 | 10 | 53 | 0.41 | 0.52 | 0.51 | 0.76 | 730 |
| 5.8 | PEF3 | 5 | 82 | 0.17 | 0.78 | 0.52 | 0.91 | 1200 |
| 5.9 | PEF3 | 4 | 87 | 0.18 | 0.83 | 0.51 | 0.93 | 1140 |
| 5.10 | PEF3 | 3 | 95 | 0.38 | 0.94 | 0.99 | 0.95 | 960 |
| 5.11 | PEF4 | 10 | 61 | 0.27 | 0.74 | 0.44 | 0.87 | 850 |
| 5.12 | PEF4 | 5 | 71 | 0.22 | 0.97 | 0.54 | 0.99 | 1060 |

TABLE V-continued

| Test No. | Foam Type | Needle Spacing (mm)[1] | Open-Cell Content (%)[2] | Sound Absorption Coefficient | | | | Freq. (Hz)[7] |
|---|---|---|---|---|---|---|---|---|
| | | | | 500 Hz[3] | 1000 Hz[4] | 2000 Hz[5] | Maximum[6] | |
| 5.13 | PEF4 | 4 | 79 | 0.17 | 0.84 | 0.52 | 0.98 | 1200 |
| 5.14 | PEF4 | 3 | 92 | 0.41 | 0.91 | 0.80 | 0.95 | 880 |

ND = not determined.
None = no holes punched (nascent foam).
[1]The spacing between the holes in a square pattern.
[2]Open-cell content as determined per ASTM D-2856 Procedure C; the same data as in Table I.
[3]Sound absorption coefficient at 500 Hz determined per ASTM D-1050.
[4]Sound absorption coefficient at 1000 Hz determined per ASTM D-1050.
[5]Sound absorption coefficient at 2000 Hz determined per ASTM D-1050.
[6]The maximum sound absorption coefficient at a frequency below 1600 Hz.
[7]The frequency where the maximum absorption occurs.

Figure 6:
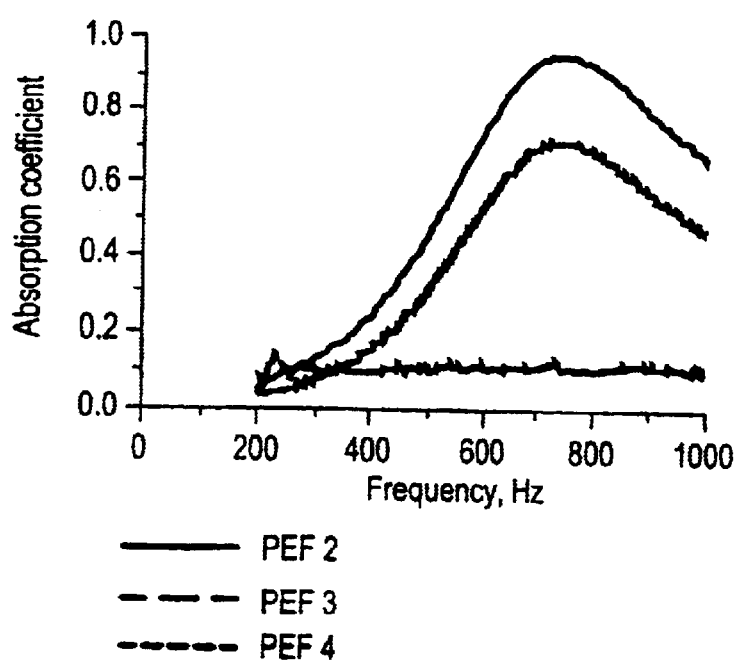
FIG. 6 depicts a sound absorption curve of a foam of the present invention.
Figure 7:
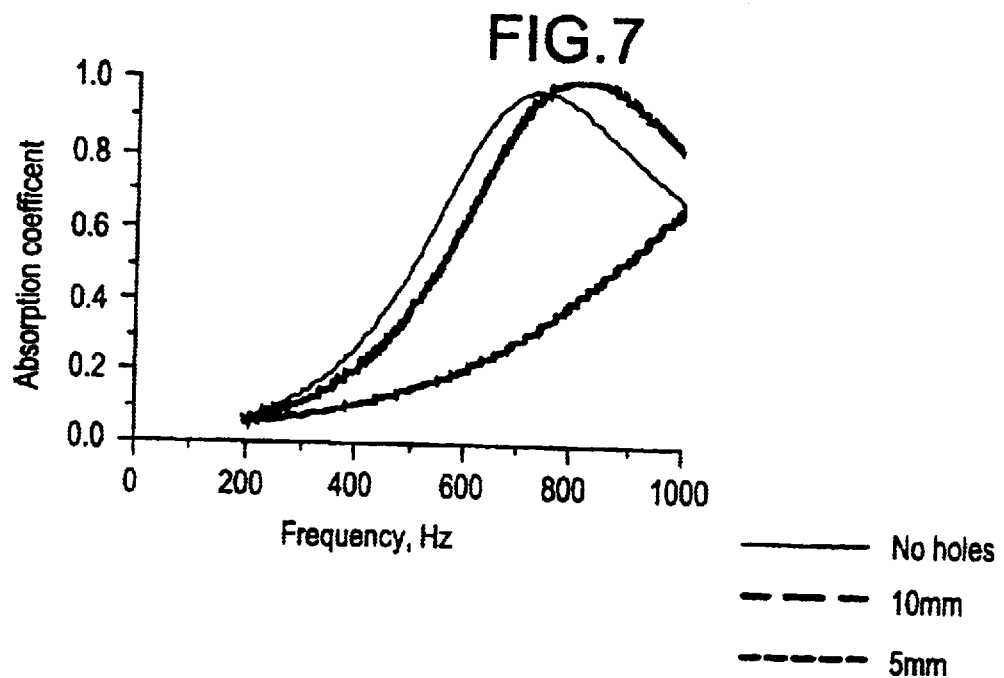
FIG. 7 depicts a sound absorption curve of a foam of the present invention.

All foams showed active sound absorption capability. Surprisingly, the nascent large-celled foams display excellent sound absorption capabilities (Test No. 5.1 and 5.6). The full absorption curves of these foams and nascent PEF4 foam (Test No. 4.1) are compared in FIG. 6. The superior sound absorption capabilities of the large-celled foams are evident in FIG. 6. The cells cut open at the surfaces of the foam specimens were inferred to contribute to the outstanding sound absorption properties of the foams. In the case of macrocellular PEF2, the nascent foam absorbed sound better than the hole punched foam and the sound absorption capability tends to deteriorate as the hole density was increased for holes punched with a 2 mm needle. This trend is more clearly seen in FIG. 7. Sound absorption was affected by both the open-cell content and the specific airflow resistance. It is known that too low a specific airflow resistance is detrimental to the sound absorption. This offers an explanation as to why the sound absorption decreased as the hole density was increased. An apparent reversal of the trend with 3 mm hole-spaced foam was probably due to the use of a smaller needle (1.5 mm diameter). In PEF3, the foam specimen hole-punched at 10 mm spacing provided the best sound absorption (Test No. 5.7). In PEF4, which had a relatively small cell size, a foam specimen with holes at 5 mm spacing (Test No. 5.12) absorbed sound slightly better than one with holes at 10 mm spacing (Test No. 5.11).

Test 6
Effect of Faced Film on Sound Absorption

The effect of skin and an attached film on the sound absorption properties of hole-punched PEF2 foam specimens was investigated in this test. A DAF 899 brand adhesive film (commercially available by The Dow Chemical Company) was used as the facer for the foam specimen. The film was prepared from PRIMACORE* 3330 ethylene/acrylic acid copolymer (Trademark of The Dow Chemical Company). The film of approximately 37 micrometer in thickness was ironed on to the surface of a foam specimen whose skins were removed. The iron was lined with a Teflon™ tetrafluoroethylene fluorocarbon polymer (Trademark of Du Pont de Nemours Co.) sheet in order to prevent the film from sticking to the iron. Both foams punched in 10 mm and 5 mm spacing were employed for the tests of this Example. The film-faced specimens were compared with those with skins removed. In the case of the foam specimen with holes punched in 10 mm spacing, the test included a specimen having the skin left in one side. The thickness of all specimens was fixed at 35 mm and the sound absorption coefficients of the specimens were determined with the surface with film or skin faced to the sound source. The results of the sound absorption tests are set forth in Table VI and Figure VIII, where the results of Tests 6.4 and 6.5 are compared:

TABLE VI

| Test No. | Needle Spacing (1) | Specimen Surface (2) | Sound Absorption Coefficient | | | | | Freq. (Hz) (8) |
|---|---|---|---|---|---|---|---|---|
| | | | 250 Hz (3) | 500 Hz (4) | 1000 Hz (5) | 1600 Hz (6) | Maximum (7) | |
| 6.1 | 10 | skin removed | 0.09 | 0.55 | 0.91 | 0.41 | 1.00 | 1030 |
| 6.2 | 10 | with skin | 0.19 | 0.32 | 0.86 | 0.31 | 0.96 | 920 |
| 6.3 | 10 | with film | 0.20 | 0.28 | 0.84 | 0.28 | 0.92 | 920 |
| 6.4 | 5 | skin removed | 0.05 | 0.24 | 0.59 | 0.78 | 0.82 | 1280 |
| 6.5 | 5 | with film | 0.47 | 0.44 | 0.72 | 0.45 | 0.94 | 760 |

(1)The spacing between holes in square pattern in mm

Figure 8:
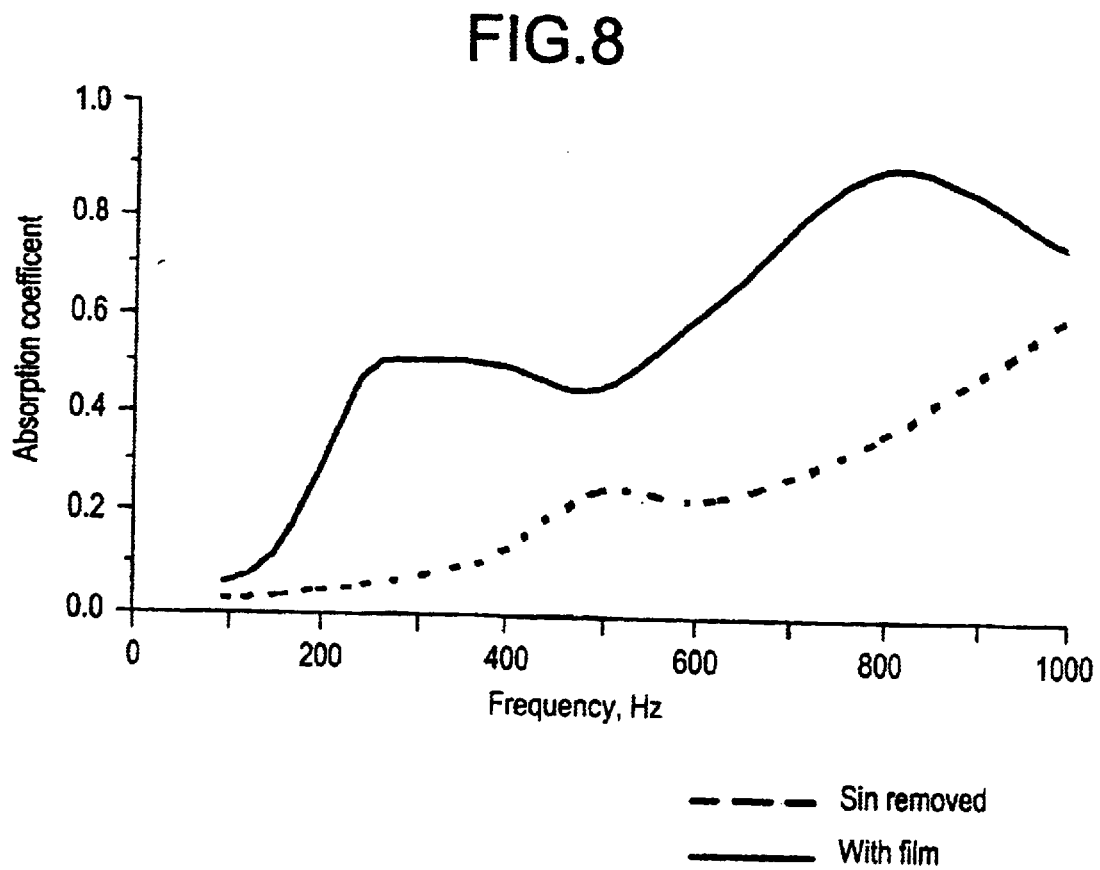
FIG. 8 depicts a sound absorption curve of a foam of the present invention.

As shown in the table and FIG. 8, the film attachment dramatically improved the sound absorption performance of the foams at low frequencies. In the case of the foam specimen hole-punched in 5 mm spacing, the film enhanced sound absorption at the entire frequency range below 1000 Hz.

Test 7
Sound Insulation Performance as a Low-Stiffness Profile Insert in W-shape In this test, the sound insulation performance of hole-punched foams as an insert for a double-leaf partition was investigated. The sound transmission tests were done at a CEBTP laboratory. The sound transmission reduction facility at CEBTP had a source of 55 m³ volume and a receiving room of 51 m³. In the middle of the dividing wall of 36 cm-thickness, there was provided an opening 0.96 m in width, 1.96 m in thickness, and 12 cm in depth when seen from the source room. The hole was enlarged to 1.08 m by 2.06 m size in the remainder of the wall thickness, where the test panel was to be installed. A panel of 1.05 m by 2.05 m size was installed in the opening. The sound transmission loss through the panel installed in the opening was measured and calculated per a method described in ISO R 717–1968.

In practice, large-celled polyethylene foams prepared in Example 1 were punched in a selected hole pattern with a selected needle as shown in Table VII. An acoustical polyurethane foam was also included in the test for comparison. The foams were profiled into a low-stiffness configuration (W) as shown in the notes section of Table VI. A straight insert (I) was also tested for a foam for comparison. Pressed wood sheets of 13 mm thickness were used as the lacers for all panels in this Example. The panels were put together using a commercial panel glue. The peripheral gaps between the wall and the edge of the specimen were filled with a fiber glass and then sealed off with a caulking material.

TABLE VII

| | | | Hole Punching | | | |
|---|---|---|---|---|---|---|
| Test No. | Foam Type | Configu-ration[1] | Needle Size (mm)[2] | Hole Spacing (mm)[3] | Open-Cell Content (%)[4] | SRI (dB(A))[5] |
| 7.1 | PEF2 | W | 3 | 5 | 94 | 42.2 |
| 7.2 | PEF2 | W | 2 | 5 | 94 | 42.6 |
| 7.3 | PEF2 | W | 2 | 10 | 81 | 40.3 |
| 7.4 | PEF3 | W | 4 | 5 | 77 | 40.6 |
| 7.5 | PEF3 | W | 3 | 5 | 74 | 41.2 |
| 7.6 | PEF3 | W | 2 | 5 | 82 | 40.0 |
| &.7 | PEF4 | W | 3 | 5 | 67 | 40.9 |
| 7.8 | PEF4 | W | 2 | 5 | 71 | 40.2 |
| 7.9 | PEF4 | W | 4 | 10 | 55 | 39.1 |
| 7.10 | PEF4 | W | 3 | 10 | 52 | 38.5 |
| 7.11 | PEF4 | W | 2 | 10 | 52 | 37.6 |
| 7.12* | PEF5 | W | 4 | 10 | 37 | 36.6 |
| 7.13* | PUF | W | None | — | 96 | 44.9 |
| 7.14* | PEF2 | W | 2 | 5 | 94 | 34.2 |

*Not an Example of this invention.
[1]W = Insert with a 35 mm-thick foam core supported by 40 mm-wide and 7 mm-thick strips spaced by 337 mm (distance between the middle points of the strips on the same side) alternately on the opposite side contacting the facers (see FIG. 11)
I = a straight slab core of 54 mm in thickness (see FIG 9).
[2]Diameter of the needle used to punch the holes in millimeters.
[3]Spacing between holes punched in a square pattern in millimeters.
[4]Open-cell content in percent determined per ASTM D-2856 Procedure C, with a cylindrical specimen of 45 mm in diameter and 35 mm in length.
[5]Sound reduction index measured at CEBTP in deciBells (A).

The sound transmission loss data through the panels are summarized in terms of A-weighted sound reduction indices for a pink noise. The data are arranged in the general order of the cell size, needle size, and the hole density. An examination of the data revealed the parameters impacting the sound insulation performance: the insert configuration; the foam type; open-cell content; and the airflow resistance (the hole density and size of the needle). Foam cores of the low-stiffness core configuration (W) provided a far better sound insulation than a straight one (I) (Compare Tests 7.2 and 7.14). Among hole-punched foams with the W configuration, the open-cell content had the greatest impact on sound insulation followed by airflow resistance. PEF2 foam profiles hole-punched to have greater than 90 percent open-cells provided a sound reduction index (SRI) between 42 to 43 dB(A). The performance, while a little lower than that of a polyurethane foam, was quite satisfactory. Foam specimens made from PEF2, PEF3, and PEF4 foams, containing 67 to 82 percent open-cell, demonstrated an SRI in the range of 40.0 to 41.2 dB(A). PEF4 specimens hold-punched at a 10 mm by 10 mm pattern had an open-cell content of 52 to 55 percent and a marginal SRI in the range of 37.6 to 39.1 dB(A). Among them, a specimen hold-punched with the large needle yields the greater sound insulation performance. The small-celled PEF5 records an unsatisfactory 36.6 dB(A) performance.

Test 8
Sound Insulation Performance as a Low-Stiffness Profile Insert in U-shape In this test, PEF2 foam hole-punched with a 2 mm needle at a 5 mm by 5 mm pattern was cut to a different low-stiffness foam profile as shown in the notes of Table VIII, and tried as an insert for a double-leaf panel. The configuration (U) consisted of a 42 mm-thick straight foam slab, which had supports of 40 mm width and 7 mm thickness at the ends. The sound insulation performance of the U foam-core was tested by the same procedure as in Test 6. The data are summarized in Table VIII.

TABLE VIII

| | | | Hole Punching | | | |
|---|---|---|---|---|---|---|
| Test No. | Foam Type | Configuration[1] | Needle Size (mm)[2] | Hole Spacing (mm)[3] | Open Cell Content (%)[4] | SRI (dB(A))[5] |
| 8.1 | PEF2 | U | 2 | 5 | 94 | 43.0 |

[1]1.05 m-wide insert with the shape as shown in FIG. 10 with a foam body of 42 mm in thickness and two supports of 40 mm in width and 7 mm in thickness at the ends.
[2]Diameter of the needle used to punch the holes in millimeters.
[3]Spacing between holes punched in a square pattern in millimeters.
[4]Open-cell content in percent determined per ASTM D-2856 Procedure C. with a cylindrical specimen of 45 mm in diameter and 35 mm in length.
[5]Sound reduction index measured at CEBTP As shown, the hole-punched macrocellular foam when inserted in a U profile in a double-leaf panel provided a satisfactory sound insulation performance.

Test 9
Water Absorption

A 12 cm by 12 cm by 3.5 cm specimen was cut out of the hole punched polyethylene foam as used in Test 8 and submerged in plain tap water for approximately 30 seconds. The specimen was taken out of the water and weighed after the surface water was dripped away. The specimen was found to weight 10.5 times more than the specimen prior to water-soaking. The water could be easily squeezed out of the specimen. The test results indicate that such a hole-punched macrocellular foam can be used to make materials requiring water absorption as in a cleaning pad.

Test 10
Impregnation of Fire Retardant

Foam specimens of approximately 31 cm by 53 cm by 1 25 cm were prepared from the hole-punched foam as used in Test 8. A 30 percent aqueous solution was prepared of a fire retardant material provided by Norfire AS of Norway. The proprietary fire retardant was indicated to contain 12 to 15 percent ammonium sulfate, 1 to 4 percent each of sodium tetraborate decahydrate, sodium chloride, and sodium phosphate. In practice, a foam specimen was submerged in the fire retardant solution contained in a shallow pan. The foam specimen was observed to quickly absorb the fire retardant solution. When taken out of the solution, the specimen retained most of the solution absorbed therein. In Test No. 10.3, the solution was squeezed out of the foam specimen. The solution-impregnated specimens were weighed, dried for four hours at an ambient temperature, then in an oven maintained at 60° C. overnight. The weights of the foam specimens were monitored during drying. In Tests Nos. 10.2 and 10.3, the fire retardant crystals loosely hanging on the surface of the foam specimens were scraped away and the final retention of the fire retardant in the foam was determined. The foam specimens were subjected to a limiting oxygen index (LOI) test. As shown in Table IX, the foam specimens absorb large amounts of solution and water dries out of the open-celled foam with relative ease. The specimen from which the solution has been squeezed out (Test No. 10.3) is shown to lose most of the absorbed water during 6 hour drying (4 hours at ambient temperature and 2 hours at 60° C.). The fire retardant-pregnated foams exhibit relatively high LOIs.

listed in Table X. Isobutane was used as the blowing agent at 9.13 pph for preparation of all of the foams. As in Example 1, a small mount of glyerol monostearate was added for the control of foam dimensional stability. For preparation of the polyethylene foam (PEF6) and ESF1 PE/ESI blend foam, a small amount of talc was added in a concentrate form (50 percent talc in the same polyethylene) for cell size control. The effective talc level was 0.068 pph for PEF6 foam and 0.034 pph for ESF1. No nucleator was added to ESF2.

Both ESF1 and ESF2 foams were prepared from the same 70/30 blend of polyethylene and ESI resin. A small amount (0.05 pph) of antioxidant (Irganox 1010 from Ciba Geigy Corp.) was incorporated into all three foams. At a cooling zone temperature of approximately 110° C. and die temperature of 111° C., all three formulations produced excellent quality foams. The cross-sectional sizes of the foams were approximately 60 mm in thickness and 620 mm in width. As shown in Table X, the foams have approximately 29 to 30 kg/m$^3$ density and large cell sizes. The average cell sizes ranged from 5.6 to 6.7 mm.

TABLE IX

| Test No. | Squeezed? | Weight Gain After App.[2] | Gained Weight After Drying | | | | Final FR Cont. (g) | LOI (%) |
|---|---|---|---|---|---|---|---|---|
| | | | Ambient 4 h (g)[3] | @ 60° C. 2 h (g)[4] | @ 60° C. 4 h (g)[5] | @ 60° C. 16 h (g)[6] | | |
| 10.1 | No | 13.5 | 7.7 | 4.2 | 3.2 | 2.6 | 2.6 | >31 |
| 10.2 | No | 12.7 | 6.0 | 3.8 | 2.9 | 2.3 | 1.1 | 23.5 |
| 10.3 | Yes | 4.0 | 1.8 | 1.2 | 1.1 | 1.0 | 0.7 | 22.3 |

[1]No = the solution was not squeezed out; Yes = the solution was squeezed out after application.
[2]Amount of solution absorbed in a gram of foam body.
[3]Amount of solution remaining in a gram of foam body after drying for 4 hours at an ambient temperature.
[4]Amount of solution remaining in a gram of foam body after drying for 2 hours at 60° C.
[5]Amount of solution remaining in a gram of foam body after drying for 4 hours at 60° C.
[6]Amount of solution remaining in a gram of foam body after drying for 16 hours at 60° C.
[7]Final amount of the solid fire retardant retained in a gram of foam body after scraping off.
[8]Limiting Oxygen Index: minimum concentration of oxygen, expressed as volume percent, in a mixture of oxygen and nitrogen that will just support flaming combustion of a material initially at room temperature under the conditions of this test.

EXAMPLE 2

The apparatus used in this Example is a commercial foam extrusion line having essentially the same configuration as used in Example 1. In this Example, three additional macrocelluar polyolefin foams were prepared from a low density polyethylene resin and a blend of the resin with an ethylene-styrene interpolymer (ESI) resin. The polyethylene resin had a melt index of 1.8 dg/minute (at 190° C./2.16 kg) and a density of 0.923 g/cm$^3$. The ESI resin used was INDEX DS 201 brand produced by The Dow Chemical Company using a constrained geometry catalyst. The approximately 70/30 styrene/ethylene copolymer resin has a melt index (at 190° C./12.16 kg) of 1.1. Foams were prepared from a 70/30 blend of the polyethylene resin and the ES copolymer resin as well as the polyethylene resin.

The foam expansion procedure was essentially the same as in Example 1. The foams prepared in this Example are

TABLE X

| Foam Designation | Foam Density (kg/m3) | Cell Size Vert. (mm) | Cell Size Extr. (mm) | Cell Size Horiz. (mm) | Cell Size EH Av. (mm) | Cell Size 3D Av. (mm) |
|---|---|---|---|---|---|---|
| PEF6 | 30 | 7.4 | 8.0 | 6.8 | 6.4 | 6.7 |
| ESF1 | 29 | 5.8 | 6.0 | 4.9 | 5.5 | 5.6 |
| ESF2 | 29 | 6.8 | 6.8 | 6.0 | 6.4 | 6.5 |

Notes: (1) through (5) = the same as in Table 1

Test 11
Open-Cell Development by Hole Punching and Compression

The foams were skived to slabs of 35 mm thickness and punched holes in 10 mm and 5 mm spacing with a 2 mm diameter needle. Specimens of cylindrical shape having 45 mm diameter was bored out of the slabs. One of the specimens having 5 mm hole spacing was compressed to 95 percent of its thickness to further develop open-cells. All of the compressed foams recovered well to near their original thickness. Open-cells were determined using the cylindrical specimens of 45 mm diameter and 35 mm thickness. The open-cell contents were determined per ASTM D2856 procedure C. As shown in Table XI, the desired high level of open-cells developed by hole punching. Since hole punching in 5 mm spacing already provided open-cell contents in the range from 92 to 95 percent, a further development of open-cells by compression was small. As anticipated, ESF1 having slightly smaller cells than the rest develops open-cells slightly less.

TABLE XI

| Foam Desig. | 10 mm Spacing (1) | 5 mm Spacing (2) | 5 mm Spacing & Compression (3) |
|---|---|---|---|
| PEF6 | 72.5 | 94.7 | 95.3 |
| ESF1 | 69.2 | 92.6 | 94.5 |
| ESF2 | 72.9 | 94.4 | 95.7 |

(1) Open-cell content of foam body hole punched in 10 mm spacing in percent.
(2) Open-cell content of foam body hole punched in 5 mm spacing in percent.
(3) Open-cell content of foam body hole punched in 10 mm spacing and then compressed to 95% of the original thickness in percent.

Test 12

Mechanical and Vibration Damping Properties

The mechanical and vibration damping properties of the hole-punched foams were determined in order to know the suitability of the foam materials for use as an insert in a sandwich panel. The dynamic stiffness and loss factor were determined using a vibration table. A disc-shape foam specimen of 10 cm in diameter and 35 mm in thickness was mounted on a vibration table. On the top of the specimen, there was loaded a particle circular particle board of the same diameter. The surface weight of the particle board was approximately 10 kg/m². One accelerometer was attached under the table and the other on the top surface of the particle board weight. The table was shaken vertically in random frequencies and the resonance frequency and damping ratio were determined from the accelerometer signals using a Brueel and Kjaer Model 3555 signal analyzer as used in Test 4. The dynamic stiffness was calculated from the resonance frequency, and the loss factor from the damping ratio. The mechanical and vibration properties of the foams are given in Table XII.

TABLE XII

| Foam Desig | Needle Spacing (1) | Compress. Strength (2) | Compress. Modulus (3) | Tensile Strength (4) | Tensile Modulus (5) | Tensile Elong. (6) | Dynamic Stiffness (7) | Loss Factor (8) |
|---|---|---|---|---|---|---|---|---|
| PEF6 | 10 | 25 | 747 | 154 | 1260 | 30 | 3.5 | 0.41 |
| PEF6 | 5 | 22 | 566 | ND | ND | ND | 1.7 | 0.35 |
| ESF1 | 10 | 17 | 482 | 131 | 790 | 51 | 4.8 | 0.46 |
| ESF1 | 5 | 15 | 362 | ND | ND | ND | 3.2 | 0.48 |
| ESF2 | 10 | 16 | 464 | 134 | 814 | 54 | 5.0 | 0.39 |
| ESF2 | 5 | 14 | 332 | ND | ND | ND | 3.1 | 0.46 |

Note: ND = Not determined.
(1)The spacing between holes in square pattern in millimeters.
(2)Compressed strength in the vertical direction in kiloPascals determined per ASTM D-3575.
(3)Compressive modulus in the vertical direction in kiloPascals determined per ASTM D-3575.
(4)Tensile strength at break in the vertical direction in kiloPascals determined per ASTM D-3575.
(5)Tensile modulus in the vertical direction in kiloPascals determined per ASTM D-3575.
(6)Tensile elongation in the vertical direction in percent determined per ASTM C-3575.
(7)Dynamic stiffness in megaNewtons per cubic meter determined with a 35 mm thick foam specimen with a surface weight of 10 kilograms per square meter.
(8)Loss factor determined at the same condition as for determination of dynamic stiffness.

As shown in the table, the foams have adequate compressive strength and tensile toughness for use as a sandwich panel insert. As anticipated, blending in the ESI resin made the foam softer. The PE/ESI blended foams were tougher as indicated by greater elongation. Punching holes at a higher density of 5 mm spacing results in a minor reduction in the compressive strength. The higher hole-punching density was shown to have a greater impact on the dynamic stiffness. Advantageously, the dynamic stiffness was reduced to the greater extent than the compressive strength. All foams exhibit good damping characteristics with loss factor in the range from 0.35 to 0.48. As expected from the highly damping ESI resin, PE/ESI blended foams, in general, had higher loss factors than the PE foam, but the difference among the 10 mm-spaced hole foams was small. Interestingly, the PE/ESI blended foams saw an advantageous increased in the loss factor as more holes were punched. In contrast the PE foam experienced a decreased in the loss factor as more holes were punched therein.

Test 13

Sound Absorption Coefficient

The sound absorption coefficients of the hole-punched macrocellular foams were measured per ASTM E-1050 using the apparatus as described in Test 4. As shown in Table XIII, the polymer composition had a minor effect on the sound absorption capability of the foam. As observed before, a higher hole density deteriorated the sound absorption capability. The good sound absorption performance of a macrocelluar foam was once again substantiated by the foams punched at 10 mm spacing.

TABLE XIII

| Foam Desig. | Needle Spacing (1) | Sound Absorption Coefficient | | | | | Freq. (Hz) (7) |
|---|---|---|---|---|---|---|---|
| | | 250 Hz (2) | 500 Hz (3) | 1000 Hz (4) | 2000 Hz (5) | Maximum (6) | |
| PEF6 | 10 | 0.21 | 0.77 | 0.60 | 0.75 | 1.00 | 800 |
| ESF1 | 10 | 0.16 | 0.79 | 0.46 | 0.61 | 0.92 | 740 |
| ESF2 | 10 | 0.15 | 0.77 | 0.50 | 0.64 | 0.95 | 780 |
| PEF6 | 5 | 0.08 | 0.28 | 0.96 | 0.43 | 0.99 | 960 |
| ESF1 | 5 | 0.09 | 0.29 | 0.96 | 0.67 | 0.98 | 1020 |
| ESF2 | 5 | 0.08 | 0.25 | 0.96 | 0.59 | 0.99 | 1030 |

Notes:
(1) The spacing between holes in square pattern in millimeters.
(2) Sound absorption coefficient at a frequency of 250 Hz determined per ASTM E-1050.
(3) Sound absorption coefficient at a frequency of 500 Hz determined per ASTM E-1050.
(4) Sound absorption coefficient at a frequency of 1000 Hz determined per ASTM E-1050.
(5) Sound absorption coefficient at a frequency of 2000 Hz determined per ASTM E-1050.
(6) The maximum sound absorption coefficient at a frequency below 1600 Hz.
(7) The frequency where the maximum occurs.

What is claimed is:

1. A process for preparing a cellular thermoplastic polymer foam structure comprising the steps of:
    a) providing a first cellular thermoplastic polymer foam structure with an average cell diameter of from 2 mm to 15 mm, wherein at least some portion of the cells thereof are closed-cells; and
    b) applying a means for opening closed-cells in a cellular thermoplastic polymer foam to at least some portion of at least one surface of said first thermoplastic polymer foam structure, such application being sufficient to result in a cellular thermoplastic polymer foam structure having an average cell diameter of from 2 mm to 15 mm wherein greater than 50 percent of the cells have been opened by the application of the means for opening closed-cells in a cellular thermoplastic polymer foam.

2. A process according to claims 1 wherein the first cellular thermoplastic polymer foam structure is substantially closed-celled.

3. A process according to claim 1 wherein the first cellular thermoplastic polymer foam structure is substantially open-celled.

4. A process according to claim 1 wherein the first cellular thermoplastic polymer foam structure has average cell diameter of from 2 mm to 10 mm.

5. A process according to claim 4 wherein the first cellular thermoplastic polymer foam structure has an average cell diameter of from 3 mm to 10 mm.

6. A process according to claim 5 wherein the first cellular thermoplastic polymer foam structure has an average cell diameter of from 4 mm to 8 mm.

7. A process according to claim 1 wherein the first cellular thermoplastic polymer foam structure is prepared from an olefinic polymer.

8. A process according to claim 7 wherein the olefinic polymer is selected from ethylenic polymers, copolymers, or blends thereof.

9. A process according to claim 7 wherein the olefinic polymer is polypropylene.

10. A process according to claim 9 wherein the thermoplastic polymer further comprise(s) polyethylene resin(s).

11. A process according to claim 8 wherein the ethylenic polymer is a low density polyethylene.

12. A process according to claim 10 wherein the polyethylene resin(s) comprise a low density polyethylene.

13. A process according to claim 12 wherein the thermoplastic polymer further comprises an ethylenic copolymer and a low density polyethylene.

14. A process according to claim 1 wherein greater than 70 percent of the cells of the cellular thermoplastic polymer foam structure have been opened by the application of the means for opening closed-cells in a cellular thermoplastic polymer foam.

15. A process according to claim 1 wherein greater than 90 percent of the cells of the cellular thermoplastic polymer foam structure have been opened by the application of the means for opening closed-cells in a cellular thermoplastic polymer foam.

16. A process according to claim 1 wherein the cellular thermoplastic polymer foam structure has an airflow resistivity of less than 800,000 Rayls/m.

17. A process according to claim 16 wherein the cellular thermoplastic polymer foam structure has an airflow resistivity of less than 400,000 Rayls/m.

18. A process according to claim 17 wherein the cellular themoplastic polymer foam structure has an airflow resistivity of less than 100,000 Rayls/m.

19. A process according to claim 18 wherein the cellular thermoplastic polymer foam structure has an airflow resistivity of less than 50,000 Rayls/m.

20. A process according to claim 1 wherein said means for opening is selected from perforation, slicing, compression, or combinations thereof.

21. A process according to claim 20 wherein said means for opening includes slicing.

22. A process according to claim 20 wherein said means for opening includes compression.

23. A process according to claim 22 wherein said means for opening is perforation followed by compression.

24. A process according to claim 20 wherein said means for opening includes perforation.

25. A process according to claim 24 wherein the perforation comprises one or more square patterns.

26. A process according to claim 24 wherein the perforation is performed in a one or more triangular patterns.

27. A process according to claim 24 wherein the means for opening is a compression followed by perforation.

28. A process according to claim 24 wherein the perforation is performed in a manner which results in the perforations being spaced one from another at distances which are no greater than two times the average diameter of the cells within the first cellular thermoplastic polymer foam structure.

29. A process according to claim 28 wherein the perforation is performed in a manner which results in the perforations being spaced one from another at distances which are no greater than 1.5 times the average diameter of the cells within the first cellular thermoplastic polymer foam structure.

30. A process according to claim 29 wherein the perforation is performed in a manner which results in the perforations being spaced one from another at distances which are approximately equal to the average diameter of the cells within the first cellular thermoplastic polymer foam structure.

31. A process according to claim 29 wherein the perforation is performed in a manner which results in the perforations being spaced one from another at distances which are less than the average diameter of the cells within the first cellular thermoplastic polymer foam structure.

32. A process according to claim 24 wherein the perforation comprises puncturing the first cellular thermoplastic polymer foam structure with one or more pointed, sharp objects.

33. A process according to claim 32 wherein the pointed, sharp objects is selected from needles, pins, spikes, or nails.

34. A process according to claim 31 wherein the perforation comprises puncturing the first cellular thermoplastic polymer foam structure by drilling, laser cutting, high pressure fluid cutting, air guns, or projectiles.

35. A process according to claim 14 wherein the thermoplastic polymer comprise(s) a low density polyethylene combined with polypropylene and/or an ethylene copolymer.

36. A process according to claim 35 wherein the cellular thermoplastic polymer foam structure has an average cell size greater than 4 mm.

37. A process according to claim 1 wherein the cellular thermoplastic polymer foam structure has an average cell size greater than 4 mm.

38. A process according to claim 1, wherein the cellular thermoplastic foam structure is an extruded foam in which the cells are elongated and the orientation of cell elongation is in the extrusion direction.

39. A process according to claim 36, wherein the cellular thermoplastic foam structure is an extruded foam in which the cells are elongated and the orientation of cell elongation is in the extrusion direction.

40. A process according to claim 1, wherein the cellular themoplastic polymer foam structure is in a coalesced strand form.

41. A process according to claim 36, wherein the cellular thermoplastic polymer foam structure is in a coalesced strand form.

42. A process according to claim 1, wherein the cellular thermoplastic polymer foam structure is in the form of non-crosslinked beads.

43. A process according to claim 1, wherein the cellular thermoplastic polymer foam structure has an average cell diameter greater than 2 mm and greater than 50 percent of the cells have been opened by mechanical means measured according to ASTM D2856, Procedure C.

44. A process according to claim 1, wherein the cellular thermoplastic polymer foam structure has been grafted with a vinyl functional silane or an azido functional silane.

45. A process according to claim 44 further comprising crosslinking the cellular thermoplastic polymer foam structure.

* * * * *